(12) United States Patent
Juul

(10) Patent No.: US 11,039,627 B2
(45) Date of Patent: Jun. 22, 2021

(54) METHOD FOR OBTAINING BLOOM-RETARDING COMPONENTS FOR CONFECTIONARY PRODUCTS

(71) Applicant: AAK Denmark A/S, Malmö (SE)

(72) Inventor: Bjarne Juul, Aarhus (DK)

(73) Assignee: AAK Denmark A/S, Aarhus C (DK)

( * ) Notice: Subject to any disclaimer, the term of this patent is extended or adjusted under 35 U.S.C. 154(b) by 1648 days.

(21) Appl. No.: 14/441,224

(22) PCT Filed: Nov. 6, 2013

(86) PCT No.: PCT/DK2013/050363
§ 371 (c)(1),
(2) Date: May 7, 2015

(87) PCT Pub. No.: WO2014/071955
PCT Pub. Date: May 15, 2014

(65) Prior Publication Data
US 2015/0296830 A1    Oct. 22, 2015

Related U.S. Application Data

(63) Continuation-in-part of application No. PCT/DK2012/050410, filed on Nov. 7, 2012.

(30) Foreign Application Priority Data

Nov. 7, 2012 (WO) ................ PCT/DK2012/050410

(51) Int. Cl.
*A23G 1/00* (2006.01)
*A23G 1/36* (2006.01)
(Continued)

(52) U.S. Cl.
CPC ............ *A23G 1/0009* (2013.01); *A23D 9/02* (2013.01); *A23D 9/04* (2013.01); *A23G 1/36* (2013.01);
(Continued)

(58) Field of Classification Search
CPC ... A23D 9/04; A23D 9/02; C11B 3/14; A23G 1/36; A23G 1/0009; A23G 1/46; A23V 2002/00
See application file for complete search history.

(56) References Cited

U.S. PATENT DOCUMENTS 4,464,703 A * 8/1984 Davies ............... H02B 1/56
200/50.23
4,465,703 A * 8/1984 Jasko ................ C11B 7/0008
426/607

(Continued)

FOREIGN PATENT DOCUMENTS

EP    0 188 122 A1    7/1986
EP    0 354 025 A1    2/1990
(Continued)

OTHER PUBLICATIONS

Lechter., "Effect of Minor Components on Cocoa Butter Polymorphism and Kinetics of Crystallization". from Cocoa Butter and related Compounds. pp. 213-232. (Year: 2012).*

(Continued)

*Primary Examiner* — Erik Kashnikow
*Assistant Examiner* — Assaf Zilbering
(74) *Attorney, Agent, or Firm* — Finnegan, Henderson, Farabow, Garrett & Dunner, LLP

(57) ABSTRACT

The invention relates to a method for producing a bloom-retarding component for chocolate and chocolate-like products, the method comprising the step of: Deodorizing a triglyceride composition, said triglyceride composition comprising at least 40% by weight of mono unsaturated symmetric triglycerides selected from the group consisting of POP, StOSt and POSt, where P equals palmityl, St equals stearyl and O equals oleyl, the deodorizing taking place for at least 60 minutes at a temperature of at least 220° C.

17 Claims, 1 Drawing Sheet

(51) Int. Cl.
    *A23L 5/20* (2016.01)
    *C11B 3/14* (2006.01)
    *A23D 9/04* (2006.01)
    *A23D 9/02* (2006.01)
    *A23G 1/46* (2006.01)

(52) U.S. Cl.
    CPC .................. *A23G 1/46* (2013.01); *A23L 5/21* (2016.08); *C11B 3/14* (2013.01); *A23V 2002/00* (2013.01)

(56) References Cited

U.S. PATENT DOCUMENTS

| | | | |
|---|---|---|---|
| 5,210,241 | A | 5/1993 | Lin |
| 5,409,728 | A * | 4/1995 | Itagaki ..................... A23D 9/00 426/606 |
| 7,452,702 | B2 | 11/2008 | Lee |
| 2001/0028914 | A1 | 10/2001 | Okada et al. |
| 2005/0014237 | A1 | 1/2005 | Lee |
| 2010/0112161 | A1 | 5/2010 | Akahane et al. |

FOREIGN PATENT DOCUMENTS

| | | |
|---|---|---|
| EP | 2 319 329 A1 | 5/2011 |
| RU | 2 437 548 C2 | 12/2011 |
| SU | 499695 A1 | 11/1976 |
| WO | WO 2008/010543 A1 | 1/2008 |
| WO | WO 2008/113524 A1 | 9/2008 |
| WO | WO 2011/161213 A1 | 12/2011 |
| WO | WO 2012/139574 A1 | 10/2012 |

OTHER PUBLICATIONS

English language abstract of RU 2 437 548 C2, Dec. 27, 2011.
English language abstract of RU 2 445 351 C2, Mar. 20, 2012, now published as WO 2008/010543 A1.
English language abstract of SU 499695 A1, Nov. 25, 1976.
International Search Report for International Application No. PCT/DK2013/050363, dated Dec. 17, 2013.
"Edible Fats and Oils Processing: Basic Principles and Modern Practices," Edited by David R. Erickson, American Oil Chemists' Society, (1990).
"Cocoa Butter and Related Compounds," 1st Edition, Editors: Garti et al., (2012).
Calliauw et al., "Improving the Physical and Chemical Properties of Cocoa Butter by Selected Oil Processing Technologies," Crystallisation and Physical Properties of Fats, Ghent University, Belgium, (2008).
De Clercq et al., "Influence of cocoa butter refining on the quality of milk chocolate," Journal of Food Engineering, 111:412-419, (2012).
Lonchampt et al., "Fat bloom in chocolate and compound coatings," Eur. J. Lipid Sci. Technol., 106:241-274, (2004).
Nawar, "Chemical changes in lipids produced by thermal processing," J. Chem. Educ., 61(4):299-302, (1984).
Soon, "Specialty Fats versus Cocoa Butter," (1991).
Timms, "Confectionary Fats Handbook: Properties, Production and Application," The Oily Press, (2003).

* cited by examiner

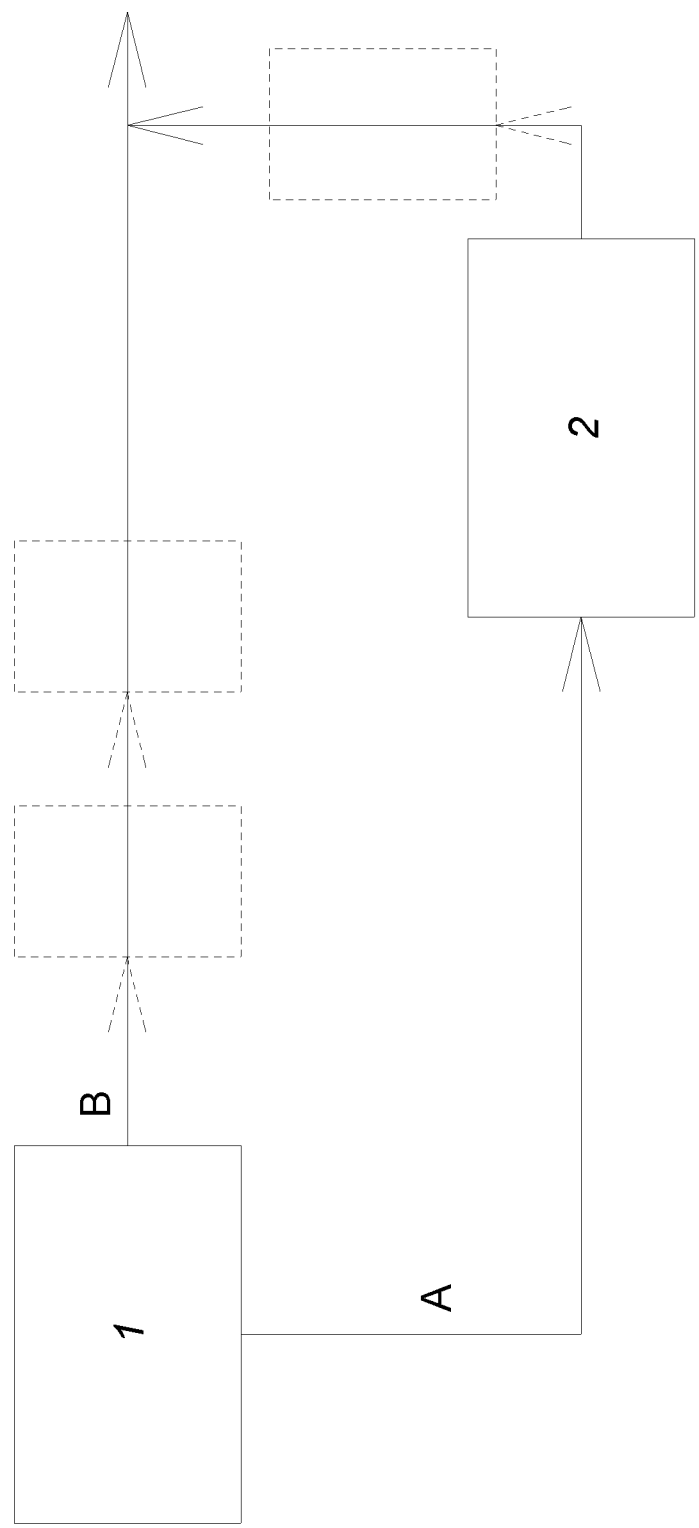

METHOD FOR OBTAINING BLOOM-RETARDING COMPONENTS FOR CONFECTIONARY PRODUCTS

This application is a national stage filing under 35 U.S.C. § 371 of International Application No. PCT/DK2013/050363 filed on Nov. 6, 2013, which claims benefit of the filing date of International Application No. PCT/DK2012/050410, filed Nov. 7, 2012, all of which are incorporated herein by reference.

TECHNICAL FIELD

The present invention relates to the field of chocolate or chocolate-like products. More specifically the present invention relates to bloom-retarding components based on cocoa butter or similar compositions.

BACKGROUND OF THE INVENTION

Chocolate is throughout the world regarded as being one of the finest types of confectionary and various types and shapes of chocolate confectionary have been developed over the years. The innovation within the field of chocolate has been much focused on sensory aspects, such as taste, and mouth feel. However, also the visual appearance is an important aspect in the consumer's overall perception of the quality of a chocolate confectionary. Accordingly, the visual appearance of a chocolate confectionary plays a key role for the chocolate manufacturer because a less attractive appearance of the confectionary will easily be judged by the consumer to relate to a confectionary of inferior quality.

An important problem relating to the visual appearance of a chocolate confectionary is the bloom effect which may be easily recognisable on the surface of the chocolate. In case blooming has occurred, the surface of the chocolate confectionary will have a rather dull appearance having less gloss and often having clearly visible bloom crystals on the surface. The appearance of bloom, if any, typically takes place after weeks or months of storage.

Chocolate generally comprises cocoa butter, cocoa solids and sugar. Milk fat and/or milk proteins, emulsifies and other ingredients may be present in chocolate composition as well.

In the manufacturing process of chocolate, the ingredients are mixed. The mixture is subjected to a tempering process in a tempering apparatus in which the chocolate is subjected to a carefully pre-programmed temperature profile. Subsequently, the chocolate is used for making the chocolate confectionary and the resulting confectionary is cooled following a predetermined cooling program.

The tempering process serves the purpose of making a sufficient amount of a desired type of seed crystals of the solid fats present in the chocolate, which in turn is responsible for obtaining a rather stable chocolate product less prone to changes in the crystal composition of the solid fats. The desired seed crystals are of the crystal form V. It is believed that the bloom effect occurring in chocolate confectionary is occasioned by polymorph transformation of fat crystals present in the chocolate.

The bloom in chocolate is a well-studied phenomenon and among chocolate manufactures it is agreed that the bloom effect may in some cases be related to solid fat crystals transforming from the Form V to the Form VI crystal phase. Such recrystallization into Form VI crystals may then accordingly result in bloom on the surface of the chocolate confectionary.

It should be noted though, that bloom may also occur in a chocolate product in case the chocolate composition has been poorly tempered.

In the prior art various ways of avoiding the bloom effect in chocolates have been suggested. Such suggestions for avoiding bloom formation relate for example to optimising tempering conditions, adding high-melting milk fat fractions or sorbitan tristearate to the chocolate.

Also the addition of anti-blooming agents having specific tri-glyceride compositions is known. These anti-blooming agents may typically be based on vegetable fats obtained by chemical interesterification of triglyceride oils using certain catalysts.

Accordingly, in the art of manufacturing chocolate or chocolate-like products, there still exists a need for new methods for obtaining bloom-retarding components.

SUMMARY OF THE INVENTION

The invention relates to a method for producing a bloom-retarding component for chocolate and chocolate-like products, the method comprising the step of:

Deodorizing a triglyceride composition, said triglyceride composition comprising at least 40% by weight of mono unsaturated symmetric triglycerides selected from the group consisting of POP, StOSt and POSt, where P equals palmityl, St equals stearyl and O equals oleyl, the deodorizing taking place for at least 60 minutes at a temperature of at least 220° C.

In this context, the term "chocolate product" describes a product which contains up to a maximum of 5% of vegetable fats other than cocoa butter, the percentage being by weight of the total amount of ingredients in the product. Further, a "chocolate-like product" in this context describes a product which contains more than 5% of vegetable fats other than cocoa butter, the percentage being by weight of the total amount of ingredients in the product. It has surprisingly been found by the present inventor that the deodorization process, when run for long time and at high temperatures as compared to usual deodorization of triglyceride composition being rich in mono-unsaturated symmetric triglycerides, may be used to obtain a bloom-retarding component from triglyceride compositions that are commonly not subjected to such relatively harsh process conditions, that is, triglyceride compositions rich in symmetric triglycerides. The common understanding was until now that the temperature during deodorization of such compositions should be kept as low as possible and the process time should be as short as possible, because chemical changes in such compositions normally are highly undesirable. Triglyceride composition rich in symmetric triglycerides are regarded as valuable just because of their content of symmetric triglycerides, resulting in good crystallization properties and high Solid Fat Content (=SFC). Introducing asymmetry for the cost of symmetry in a process would within the art be regarded as extremely adverse.

It has been shown by the present inventor that the relative amount of asymmetric mono-unsaturated triglycerides in triglyceride compositions rich in mono-unsaturated symmetric triglycerides can be raised by the inventive process. The compositional change in the course of the inventive process is conferring bloom-retarding properties to the deodorized triglyceride composition. It is believed that the increased asymmetry in the triglyceride composition as a consequence of the inventive process may, at least partly, be responsible for the observed bloom-retarding effect in fat compositions comprising the triglyceride compositions deodorized according to the present invention.

Particular important symmetric triglycerides according to embodiments of the present invention are POP, StOSt and POSt. Compositions comprising substantial amounts of these triglycerides are not normally deodorized at high temperatures for long time, because even minor changes in the triglyceride composition are often compromising the physical and chemical properties, when the composition is to be used, for example, as an ingredient in connection with the production of confectionary products. If, for example, a Cocoa Butter Equivalent (=CBE), is desired, the melting properties of the CBE are crucial for the successful production of the confectionary product.

Surprisingly it has been found by the present inventor that, contrary to expectations, triglyceride compositions rich in POP, POSt and StOSt may be treated according to the process described herein and used as a bloom-retarding component in confectionary compositions, for example in CBE compositions, without affecting the manufacturing process and the sensory and textural properties of the confectionary product too much.

According to advantageous embodiments of the invention the triglyceride composition comprises at least 50% by weight of mono unsaturated symmetric triglycerides selected from the group consisting of POP, StOSt and POSt, where P equals palmityl, St equals stearyl and O equals oleyl, or at least 60% by weight of mono unsaturated symmetric triglycerides selected from the group consisting of POP, StOSt and POSt.

The richer the triglyceride composition is in symmetric triglycerides, the more asymmetric triglycerides may be formed during the deodorization method of the present invention. Thereby effective bloom-retarding components may be obtained.

According to embodiments of the present invention the deodorizing is performed for between 60 minutes to 600 minutes, such as between 80 minutes to 480 minutes, or between 100 minutes and 360 minutes.

A standard deodorization process for triglyceride compositions comprising at least 40% by weight of symmetric triglycerides is typically kept as short as possible, such as less than 1 hour. According to embodiments of the present invention, longer process times are needed to achieve a significant bloom retarding effect from the deodorized compositions, when the deodorized compositions are mixed into chocolate or chocolate-like products. To obtain useful bloom-retarding components, the deodorization temperature should be at least 220° C. and the process time should be at least 60 minutes. Upper limits for both time and temperature are typically chosen as a trade-off between economical and technical considerations. It may, for example, require special equipment to run the deodorization process at very high temperatures. Also, very long process times may be costly, because the equipment is occupied for a long time and process costs become high. On the other hand, the compositions obtained by deodorizing fats rich in symmetric mono unsaturated triglycerides at very high temperatures, such as above 300° C., for example 320° C., and/or for very long times, such as above 360 minutes, for example 500 minutes, may still be extremely useful as bloom-retarding components that may be added to commonly produced cocoa butter and/or CBE, the blend having improved bloom properties.

In advantageous embodiments of the invention the deodorizing is performed at a temperature of at least 225° C., such as at least 230° C. or at least 235° C. The minimum temperature used in the deodorization method according to embodiments of the present invention ensures an effective production of bloom-retarding components for chocolate and chocolate-like products. Depending on, for example, the exact composition of the blend to be deodorized, the lowest temperature needed for effectively producing bloom-retarding components may vary slightly.

In an embodiment of the invention the deodorizing is performed at a temperature between 220° C. and 300° C., such as between 230° C. and 280° C., or between 240° C. and 260° C.

A standard deodorization process for triglyceride compositions comprising at least 40% by weight of symmetric triglycerides is typically run at low temperatures, such as around 180° C. According to embodiments of the present invention, higher temperatures are needed to achieve a significant bloom retarding effect from the deodorized compositions, when the deodorized compositions are mixed into chocolate or chocolate-like products.

In further embodiments of the invention, the deodorized composition in all its embodiments is fractionated after the deodorization process. The fractionation process used may be any fractionation process allowing to fractionate tri saturated triglycerides (S3) from the desired mono unsaturated symmetric triglycerides (SatSatU) according to the invention, i.e. POP, StOSt and POSt, where P equals palmityl, St equals stearyl and O equals oleyl, and by fractionation thereby increasing the amount of the desired mono unsaturated symmetric triglycerides in the deodorized composition compared to the amount of tri saturated triglycerides. For example, removing from some few percent and more of trisaturated triglycerides will increase the ratio of SatSatU/S3 in a positive way and will for example improve the viscosity. Improving viscosity may be lowering the viscosity of the composition during subsequent tempering due to the increase in ration of SatSatU/S3 after fractionation. One fractionation process that may be used is f.ex. dry solvent fractionation.

In an embodiment of the invention, the method further comprises the step of adding the deodorized triglyceride composition to a fat composition for chocolate or chocolate-like products in an amount of between 0.1% and 90% by weight of the fat composition, such as in an amount of between 5% and 55% by weight of the fat composition, or in an amount of between 10% and 35% by weight of the fat composition.

It has surprisingly been found that the addition of triglyceride compositions deodorized according to the inventive process to a fat composition in a wide range of amounts may positively influence the bloom properties of a chocolate or chocolate-like product comprising such a fat composition.

This is believed partly to be due to the fact that different deodorization conditions result in more or less asymmetric triglycerides formed during the described deodorization process. If conditions are chosen to induce less asymmetry, for example, if the temperature is close to the lower limit and/or the process time is close to the lower limit, more of the deodorized triglycerides may be added to the fat composition for chocolate or chocolate-like products to obtain a desired improvement of bloom properties.

In specific embodiments of the invention, the triglyceride composition deodorized according to the present invention may be used for chocolate or chocolate-like products without the addition of other vegetable fat which means that all of the vegetable fat in the chocolate or chocolate-like product has been deodorized according to the present invention.

On the other hand, if deodorization conditions according to embodiments of the present invention are chosen to induce more asymmetry, for example high temperatures and/or long process times, less of the deodorized triglycerides may be added to the fat composition for chocolate or chocolate-like products to obtain a desired improvement of bloom properties.

In an embodiment of the invention the fat composition comprises cocoa butter and/or a cocoa butter equivalent.

It has been shown by the present inventor that when the deodorized triglyceride composition is added to cocoa butter and/or a cocoa butter equivalent, a bloom retarding effect in the finalized confectionery product comprising the blend may be obtained.

In an embodiment of the invention the deodorized triglyceride composition is added to a cocoa butter in an amount of 5-97% by weight of the cocoa butter, such as 10-70% by weight of the cocoa butter or 20-50% by weight of the cocoa butter.

Particularly when the deodorized triglyceride composition is added to cocoa butter, advantageous embodiments of the present invention are obtained. If a CBE, CBS, CBI or cocoa butter, all of them in even further embodiments also separately in combination milk fat, has been subjected to deodorization according to the inventive process and subsequently is added to a standard cocoa butter, a superior chocolate or chocolate-like product with respect to bloom may be obtained.

In this context, a standard cocoa butter is to be understood as a cocoa butter not treated according to the inventive process described herein. Typically, such a standard cocoa butter has either not been deodorized or has been deodorized partly or fully at low temperatures, for example 180° C. and for times shorter than 60 minutes.

In an embodiment of the invention the triglyceride composition is selected from the group consisting of cocoa butter, shea oil (*Butyrospermum parkii*), palm oil (*Elaeis guineensis, Elaeis olifera*), illipe oil (*Shorea* spp.), mango oil (*Mangifera indica*), sal oil (*Shorea robusta*), kokum oil (*Garcinia indica*) or any combination thereof.

By choosing specific triglyceride compositions, valuable bloom-retarding additives for chocolate and chocolate-like products may be obtained.

In further embodiments of the invention, the method further comprises the steps of adding milk fat to the triglyceride composition pre deodorization followed by deodorizing said milk fat together with the triglyceride composition.

By adding milk fat to the triglyceride composition, the bloom retarding properties of the deodorized blend are not compromised and a deodorized bloom retarding fat composition with a different nutritional profile may be obtained.

In an embodiment of the invention the method further comprises the step of adding water to the triglyceride composition prior to deodorization.

According to advantageous embodiments of the invention, addition of water to the triglyceride composition prior to deodorization has surprisingly been shown to promote the formation of mono-unsaturated asymmetric triglycerides (SSO) and to increase the ratio between SSO and tri-saturated triglycerides (SSS). Also, the change in solid fat content (SFC) during deodorization is lowered through the addition of water.

In this context, S equals palmityl and stearyl, while O is oleyl, as previously defined.

In embodiments of the invention the amount of water added is between 0.01 and 10% by weight of the triglyceride composition, such as between 0.1 and 5% by weight of the triglyceride composition or between 0.5 and 2.5% by weight of the triglyceride composition.

Depending on which precise deodorization result is desired, the amount of water added may be varied. Addition of too large amounts of water may be less attractive since the triglyceride processing capacity is reduced accordingly.

The exact pressure during deodorization is not critical and will typically be in the range from close to 0 mbar to about 100, 150 or even 200 mbar. Particularly, low pressure will provide the triglyceride composition excellent properties. Example of low pressure includes reduced pressure, such as 0.5, 1, 1.5, 2 2.5 3, 3.5, 4, 4.5, or 5 mbar. However, pressure of about 10, 30, 50, 100, 150 or even 200 may also work. Even further embodiments of said deodorization include a mix of pressure conditions in serial, such as initial high pressure for a certain time followed by low pressure for a certain time, or the opposite, ie initial low pressure for some time followed by high pressure for a certain time.

The invention further relates to a triglyceride composition comprising at least 40% by weight of symmetric triglycerides selected from the group consisting of POP, StOSt and POSt, and where P equals palmityl, St equals stearyl and O equals oleyl, the triglyceride composition being deodorized at reduced pressure for at least 60 minutes at a temperature of at least 220° C.

Such a triglyceride composition may have excellent properties as a bloom-retarding agent for chocolate or chocolate-like products.

The invention also relates to a fat composition comprising a triglyceride composition, the triglyceride composition comprising at least 40% by weight of symmetric triglycerides selected from the group consisting of POP, StOSt and POSt, and where P equals palmityl, St equals stearyl and O equals oleyl, the triglyceride composition being deodorized at reduced pressure for at least 60 minutes at a temperature of at least 220° C.

Such a fat composition may have excellent properties with respect to bloom when used in chocolate or chocolate-like products.

In advantageous embodiments of the invention the fat composition is a cocoa butter equivalent, cocoa butter, or a combination thereof and even in further embodiments said fat composition also further comprises milk fat.

The invention also relates to a chocolate or chocolate-like product comprising at least 2% of the triglyceride composition subjected to the process of claim 1.

According to advantageous embodiments chocolate and chocolate-like products with improved bloom properties can be obtained.

The invention also relates to a chocolate comprising, as the only vegetable fat components, cocoa butter, wherein at least 4% such as at least 6% of said cocoa butter has been deodorized at reduced pressure for at least 60 minutes at a temperature of at least 220° C.

According to advantageous embodiments of the present invention, a chocolate with improved bloom properties may be obtained by treating a part of the cocoa butter according to the inventive method.

The invention also relates to the use of a triglyceride composition comprising at least 40% by weight of mono unsaturated symmetric triglycerides selected from the group consisting of POP, StOSt and POSt, where P equals palmityl, St equals stearyl and O equals oleyl, the triglyceride composition being deodorized for at least 60 minutes at a temperature of at least 220° C., as a bloom-retarding component for chocolate and chocolate-like products.

DETAILED DESCRIPTION

The invention is now described in more detail by the following examples and FIGURES.

FIG. 1 is a schematic presentation of advantageous embodiments of the present invention.

A triglyceride composition comprising at least 40% by weight of mono unsaturated symmetric triglycerides selected from the group consisting of POP, StOSt and POSt, where P equals palmityl, St equals stearyl and O equals oleyl, for example cocoa butter or a cocoa butter equivalent, is represented by numeral 1.

A part of composition 1, represented by letter A is subjected to a deodorization according to embodiments of the present invention, the deodorization being indicated by numeral 2. After process 2, the deodorized part A is blended with a part of composition 1, represented by letter B, not having been subjected to process 2. In the context of FIG. 1, the deodorized part A is a bloom-retarding component, being mixed with part B to obtain a fat composition for chocolate or chocolate-like product with improved bloom properties. Optional further processes are indicated by dashed lines.

In some important embodiments of the invention, part A may amount to about 100% of composition 1. In other embodiments, part A may amount to about 10%, 20%, 30%, 40%, 50%, 60%, 70%, 80% or 90% of composition 1, depending on the desired bloom-properties, textural properties of the final chocolate or chocolate-like product.

It has been found that the temperature during deodorization and the time used for deodorization of certain triglyceride compositions may be used to introduce an increase of the amount of asymmetric mono-unsaturated triglycerides in the composition. At the same time, the amount of tri-saturated triglycerides may also increase but to lesser extent when compared to the increase in the asymmetric triglycerides. Surprisingly, experiments show that the ratio between asymmetric mono-unsaturated triglycerides (SSO) and saturated triglycerides (SSS) generally increases with temperature and time when applying the inventive method. This means that the somewhat undesirable increase in tri-saturation is more than compensated for by a more pronounced increase in asymmetric mono-unsaturated triglycerides.

Due to the change in the triglyceride composition as a consequence of the inventive high temperature deodorization, the solid fat content of the composition may also change slightly. It has been found that the change in SFC may be surprisingly small, whereby excellent bloom-retarding triglyceride compositions for chocolate or chocolate-like products may be obtained without severely altering the textural- and taste properties of the chocolate or chocolate-like product.

By using triglyceride compositions deodorized according to the present invention in chocolate or chocolate-like products, the addition of other bloom-retarding substances or compositions may be partly or totally omitted, while still achieving excellent bloom-properties in the final products.

In particular it may be very advantageous to achieve a bloom-retarding effect without adding catalytically interesterified compositions or other components based on fats or oils that are not naturally present in cocoa butter.

Also, when manufacturing a CBE, it may be advantageous that the content of the CBE is based on fats and oils that are not chemically modified using catalysts.

Importantly it has been found that the texture of the chocolate and chocolate-like products comprising triglyceride composition subjected to the inventive deodorization process may be excellent.

In the following Examples, embodiments of the present invention are explained in more detail.

When a standard cocoa butter or CBE is used in the examples, this refers to compositions that have not been treated according to the method of the present invention. Typically, such a standard cocoa butter has either not been deodorized or has been deodorized partly or fully at low temperatures, for example 180° C. and for times shorter than 60 minutes.

EXAMPLES

Example 1: Deodorization of Cocoa Butter

This example describes the change in the amounts of mono-unsaturated and tri-saturated triglycerides as a function of deodorization temperature and process time.

The amounts in Table 1 are in weight % of the total tri-glyceride content and are measured by standard HPLC methods.

In Table 1, S is stearyl (St) or palmityl (P) while O is oleic.

About 4 kg of West African standard cocoa butter was used for each deodorizing temperature, small samples of about 100 g being taken out for analysis after 2, 4 and 6 hours respectively.

Before deodorizing the SOS composition in the feed was 28% StOSt, 38% POSt and 14% POP.

The deodorizations were carried out at reduced pressure in standard equipment purged with $N_2$ and with added steam from a steam generator. The exact pressure during deodorization is not critical and will typically be in the range from close to 0 mbar to about 100 mbar.

TABLE 1

Change in amount of asymmetric triglycerides as a function of process temperature and process time.

| | Feed | 180° C. | | | 200° C. | | | 220° C. | | |
|---|---|---|---|---|---|---|---|---|---|---|
| | | hours | | | | | | | | |
| | | 2 | 4 | 6 | 2 | 4 | 6 | 2 | 4 | 6 |
| % SOS | 80 | 80 | 76 | 78 | 76 | 77 | 78 | 80 | 78 | 75 |
| % SSO | <0.7 | <0.7 | <0.7 | <0.7 | <0.7 | <0.7 | <0.7 | <0.7 | <0.7 | 1.25 |
| % SSS | 1.4 | 1.4 | 1.4 | 1.4 | 1.4 | 1.3 | 1.4 | 1.3 | 1.7 | 1.9 |

TABLE 1-continued

Change in amount of asymmetric triglycerides as a function of process temperature and process time.

| % SSO / % SSS | <0.5 | <0.5 | <0.5 | <0.5 | <0.5 | <0.5 | <0.5 | <0.5 | <0.4 | 0.63 |
|---|---|---|---|---|---|---|---|---|---|---|

| | 230° C. | | | 240° C. | | | 250° C. | | | 260° C. | | |
|---|---|---|---|---|---|---|---|---|---|---|---|---|
| hours | 2 | 4 | 6 | 2 | 4 | 6 | 2 | 4 | 6 | 2 | 4 | 6 |
| % SOS | 78 | 76 | 76 | 76 | 75 | 73 | 78 | 75 | 70 | 72 | 67 | 66 |
| % SSO | 1.1 | 1.0 | 1.0 | 1.0 | 1.55 | 2.5 | 0.75 | 1.85 | 3.1 | 2.0 | 3.3 | 5.7 |
| % SSS | 1.3 | 1.5 | 1.9 | 1.5 | 2.1 | 2.7 | 1.7 | 2.2 | 3.0 | 2.0 | 2.8 | 4.2 |
| % SSO / % SSS | 0.85 | 0.67 | 0.53 | 0.67 | 0.74 | 0.93 | 0.44 | 0.84 | 1.0 | 1.0 | 1.2 | 1.4 |

The following tendencies are evident from the data presented in Table 1:

The higher the deodorization temperatures, the more asymmetric triglycerides (SSO) are formed. The same is true for the process time, longer process times promoting the formation of asymmetric triglycerides, the effect being most pronounced at higher temperature.

At the same time, the amount of saturated triglycerides is also increased in the same way. Interestingly, the ratio between % SSO and % SSS also generally increases which shows that the process may be adapted for getting a larger increase in asymmetric triglycerides than in saturated triglycerides.

Interestingly, the amount of trans-fatty acid esters does not increase significantly under the process conditions given in Table 1, as measured by HPLC, data not shown.

Example 2: Deodorization of a Fat Composition Useful as Cocoa Butter Equivalent

Example 1 was repeated for fat from a different source than cocoa butter at selected temperatures and process times.

A mixture of 50% Palm middle fraction IV 33 and 50% Shea stearin IV 36 was split into two portions of approximately 3 kg each. One portion was deodorized according to Process A.: 2 hours at 220° C., the other portion was deodorized according to Process B.: 4 hours at 260° C.

Before deodorizing the SOS composition in the feed was 33% StOSt, 9% POSt and 28% POP.

TABLE 2

Change in amount of asymmetric triglycerides as a function of process temperature and process time.

| | Process | |
|---|---|---|
| | A | B |
| | 220° C. | 260° C. |
| Hours | 2 | 4 |
| %SOS | 70 | 40 |
| %SSO | 2.2 | 15 |
| %SSS | 2.7 | 12 |
| %SSO/%SSS | 0.8 | 1.3 |

It can be seen from the data in Table 2 that like in Example 1 for a different fat, the formation of asymmetric triglycerides is promoted by higher temperatures and longer process times. Similarly to Example 1, the % SSO/% SSS ration also increases.

Example 3: Bloom Behavior of Chocolate and Chocolate-Like Products

Example 3a: Bloom Behavior of Chocolate

Five Chocolates were made based on the following recipes with cocoa butter as the only vegetable fat. The only difference between the chocolates is how the cocoa butter was deodorized, process time and temperature being varied.

The composition of the chocolates is given in Table 3.

TABLE 3

Composition of 5 chocolates differing only in how the cocoa butter was deodorized.

| Recipe | 3a-1 | 3a-2 | 3a-3 | 3a-4 | 3a-5 |
|---|---|---|---|---|---|
| CB deodorized 2 hours at 180° C. | 31.0% | 15.5% | 6.2% | 15.5% | 6.2% |
| CB deodorized 6 hours at 180° C. | 0.0% | 15.5% | 0.0% | 0.0% | 0.0% |
| CB deodorized 6 hours at 240° C. | 0.0% | 0.0% | 24.8% | 0.0% | 0.0% |
| CB deodorized 6 hours at 260° C. | 0.0% | 0.0% | 0.0% | 15.5% | 24.8% |
| Cocoa Powder (11% fat) | 10.0% | 10.0% | 10.0% | 10.0% | 10.0% |
| Skim milk powder | 6.0% | 6.0% | 6.0% | 6.0% | 6.0% |
| Sugar | 52.6% | 52.6% | 52.6% | 52.6% | 52.6% |
| Lecithin | 0.4% | 0.4% | 0.4% | 0.4% | 0.4% |
| Total fat content | 32.0% | 32.0% | 32.0% | 32.0% | 32.0% |

The chocolates were all produced using the procedure described below:

All ingredients were mixed except lecithin and a part of the fat. The mass was refined on a 300 mm Bühler refiner to a particle size of 20 micron.

The refined mass was conched for 6 hours in a small Hobart machine N-50 with a 60° C. water jacket. After 4 hours the rest of the fat was added and after 5.5 hours the 0.4% lecithin was added.

The final Chocolates were cooled down to 40° C. and tempered on a marble table and analyzed for perfect tempering and then deposited into 100 gram molds and cooled in a standard cooling tunnel with three zones for 30 min.

Zone 1 was at 15° C., zone 2 was at 12° C. and zone 3 was at 15° C.

All 100 gram tablets were stored at 20° C. for 4 days before they were placed at different storage conditions for bloom testing.

Bloom evaluation was done using a standardized visual evaluation, assessing the time until strong visual bloom developed on the surface. The results are shown in Table 4, the time until strong visual bloom developed on the chocolate surface being indicated.

The temperature cycle test is performed by storing the material for twelve hours at 25° C. followed by twelve hours at 31° C., cycling between these two temperatures with intermittent evaluation of the bloom on the surface at 20° C.

TABLE 4

Appearance of strong bloom for the 5 chocolates of Table 3.

| Recipe No. | 3a-1 | 3a-2 | 3a-3 | 3a-4 | 3a-5 |
|---|---|---|---|---|---|
| 25° C. isothermal | 10 weeks | >10 weeks | >10 weeks | >10 weeks | >10 weeks |
| 20° C.--> 25° C./31° C. Cycle test | 14 days | 14 days | 23 days | 25 days | >46 days |

It can be seen from Table 4 that the chocolates comprising CB deodorized at higher temperatures and longer times provide bloom data superior to chocolates comprising only CB deodorized under milder conditions. For the isothermal data at 25° C., this tendency is also evident as can be seen by strong bloom appearing after 10 weeks for sample 3a-1, although. For the other samples, differences are clear from the temperature cycling data.

The isothermal experiment is ongoing.

Example 3b: Bloom Behavior of Chocolate-Like Products

Four compounds were made based on the recipes with four different vegetable fats in Table 5:

TABLE 5

Recipes of 4 compounds with differing fat compositions.

| Recipe | 3b-1 | 3b-2 | 3b-3 | 3b-4 |
|---|---|---|---|---|
| Example 2 Process A fat | 30.0% | 27.0% | 28.2% | 0.0% |
| Example 2 Process B fat | 0.0% | 3.0% | 1.2% | 0.0% |
| Shea stearin IV 36 | 0.0% | 0.0% | 0.6% | 0.0% |
| Standard Cocoa butter | 0.0% | 0.0% | 0.0% | 30.0% |
| Cocoa Powder (11% fat) | 15.0% | 15.0% | 15.0% | 15.0% |
| Skim milk powder | 6.0% | 6.0% | 6.0% | 6.0% |
| Sugar | 48.6% | 48.6% | 48.6% | 48.6% |
| Lecithin | 0.4% | 0.4% | 0.4% | 0.4% |
| Total fat content | 31.65% | 31.65% | 31.65% | 31.65% |

The same production procedure was used for all 4 compounds and was identical to the process described in Example 3a.

All resulting 100 gram tablets were stored at 20° C. for 4 days before they were placed at different storage conditions for bloom test.

Bloom evaluation and temperature cycling was performed as described in Example 3a. The results are given in Table 6.

TABLE 6

Appearance of strong bloom for the 4 compounds of Table 5.

| Recipe No. | 3b-1 | 3b-2 | 3b-3 | 3b-4 |
|---|---|---|---|---|
| 25° C. isothermal | >16 weeks | >16 weeks | >16 weeks | 9 weeks |
| 20° C.--> 25° C./31° C. Cycle test | 22 days | 39 days | 39 days | 14 days |

From Table 6 it is clear that samples 3b-2 and 3b-3, both comprising fat treated according to process B in Example 2 have significantly better bloom properties in the cycle test when compared to the two samples that do not comprise process B fat.

Also it can be seen from Table 6 that the compound 3b-1 is superior with respect to bloom when compared to 3b-4, the latter not comprising any fat deodorized at high temperatures.

The tempered compounds described above in this example were also used for coating tests.

Small biscuits with a fat content of 10% were individually coated with one of the four well-tempered compounds and cooled afterwards in a standard cooling tunnel with three zones for 15 min:

Zone 1 was at 15° C., zone 2 was at 12° C. and zone 3 was at 15° C.

All coated biscuits were stored at 20° C. for 4 days before they were placed at different storage conditions for bloom testing.

Bloom evaluation was performed as described in Example 3a. The results are given in Table 7.

TABLE 7

Appearance of bloom on biscuits coated with the four compounds described.

| Coating Recipe No. | 3b-1 | 3b-2 | 3b-3 | 3b-4 |
|---|---|---|---|---|
| 20° C. isothermal | >16 weeks | >16 weeks | >16 weeks | >16 weeks |
| 23° C. isothermal | 13 weeks | >16 weeks | >16 weeks | 10 weeks |

At 20° C. isothermal, no significant differences in bloom have been observed until now (tests ongoing), while at 23° C., the two composition comprising process B fat are better than the other two. Sample 3b-1, comprising Process A fat, is better than the standard at 23° C., confirming that process A produces fats with improved bloom properties in this case, while Process B is even more effective.

Example 3c: Bloom Behavior of Chocolates with Added Cocoa Butter Equivalents Three chocolates comprising no more than 5% vegetable fats not originating from cocoa butter were made based on following recipe.

TABLE 8

Chocolate compositions with varying amounts of high temperature deodorized fat.

| Recipe | 3c-1 | 3c-2 | 3c-3 |
|---|---|---|---|
| Example 2 Process A fat | 0.0% | 3.35% | 5.0% |
| Example 2 Process B fat | 0.0% | 1.35% | 0.0% |
| Shea stearin IV 36 | 0.0% | 0.30% | 0.0% |
| Cocoa liquid | 40.0 | 40.0 | 40.0% |
| Standard Cocoa butter | 10.0% | 5.0% | 5.0% |
| Sugar | 49.6% | 49.6% | 49.6% |
| Lecithin | 0.4% | 0.4% | 0.4% |
| Total fat content | 32.4% | 32.4% | 32.4% |

The same production procedure was used for all three chocolates and was identical to the process described in Example 3a.

All resulting 100 gram tablets were stored at 20° C. for 4 days before they were placed in a 25° C. isothermal storage cabinet for bloom test.

Bloom evaluation was performed as described in Example 3a. The results are given in Table 9.

TABLE 9

Appearance of bloom on chocolate with varying fat compositions

| Recipe No. | 3c-1 | 3c-2 | 3c-3 |
|---|---|---|---|
| 25° C. isothermal | 9 weeks | 16 weeks | 13 weeks |

It can be seen from Table 9 that chocolate samples 3b-2, the only samples comprising fat from process B, Example 2, have bloom properties superior to those of the other two samples. Sample 3c-3 has improved bloom properties when compared to 3c-1, which indicates a positive effect of the added fat from the added cocoa butter equivalent deodorized according to process A, Example 2.

The tempered chocolates described above in this example were also used for coating tests.

Small biscuits with a fat content of 10% were individually coated with one of the above mentioned three well-tempered chocolates and cooled afterwards in a standard cooling tunnel with three zones for 15 min.

Zone 1 was at 15° C., zone 2 was at 12° C. and zone 3 was at 15° C.

All biscuits were stored at 20° C. for 4 days before they were placed at different storage conditions for bloom test.

Bloom evaluation was done as described in Example 3a and the results are summarized in Table 10.

TABLE 10

Appearance of bloom on biscuits coated with the three chocolates described.

| Coating Recipe No. | 3c-1 | 3c-2 | 3c-3 |
|---|---|---|---|
| 20° C. isothermal | >16 weeks | >16 weeks | >16 weeks |
| 23° C. isothermal | 11 weeks | >16 weeks | 12 weeks |

It can be seen from Table 10 that samples coated with chocolate 3b-2, the only samples comprising fat from process B, Example 2, have bloom properties superior to those of the other two samples.

Example 4: Evaluation of Solid Fat Content in Relation to Bloom and Method of Deodorization This Example compares selected data from Example 1 and Example 3a with the solid fat content (SFC) of the chocolate compositions.

Table 11 shows the fat content of three chocolates differing only by how the fat, here cocoa butter, was deodorized, data from Example 1.

TABLE 11

Fat composition of chocolate recipes listed in Example 1, the cocoa butter being deodorized at different temperatures and for varying times.

| Recipe examples | 3a-1 | 3a-3 | 3a-5 |
|---|---|---|---|
| Deodorized at 180° C. for 2 hours | 100% | 20% | 20% |
| Deodorized at 240° C. for 6 hours |  | 80% |  |
| Deodorized at 260° C. for 6 hours |  |  | 80% |

Table 12 shows the SFC as measured by the indicated standard method for the recipes in Table 11, while Table 13 recaptures bloom data from Example 3a.

TABLE 12

SFC values according to IUPAC 2.150b for the recipes with the fat compositions listed in Table 11.

| Recipe | 3a-1 | 3a-3 | 3a-5 |
|---|---|---|---|
| SFC (IUPAC 2.150b) 20° C. | 74 | 71 | 63 |
| SFC (IUPAC 2.150b) 25° C. | 70 | 65 | 49 |
| SFC (IUPAC 2.150b) 30° C. | 48 | 45 | 36 |
| SFC (IUPAC 2.150b) 35° C. | 0 | 3 | 5 |

TABLE 13

Bloom data for the recipes from table 1, data form Example 3a.

| Recipe | 3a-1 | 3a-3 | 3a-5 |
|---|---|---|---|
| Days before unacceptable bloom, 20° C.–> 25° C./31° C. Cycle test | 14 | 23 | 57 |

Comparing Table 11 and Table 12 indicates that the SFC for a fat composition may change as a consequence of deodorization procedure.

The SFC is related to the sensory and textural properties of the chocolate. Recipe 3a-1 may be regarded as a standard product having the properties normally associated with chocolate products. From Table 13 it can be seen that the bloom properties for this standard chocolate are inferior to the two other recipes.

For recipe 3a-3, the SFC is still fairly close to that of the standard product 3a-1, see table 12, but the bloom properties are significantly better, see Table 13.

For recipe 3a-5, the bloom data are excellent, see Table 13, but the SFC changes more pronounced when compared to the standard product 3a-1 and product 3a-3, see Table 12.

It should be noted that all three recipes in this example may be useful for chocolate but it may sometimes be necessary to evaluate textural properties besides the bloom effect to optimize the recipes for certain purposes.

Example 5: Effect of Addition of Water to Oil

A standard West African Cocoa butter is deodorised in two different processes:
C. Deodorization at a temperature of 240° C. for 4 hours.
D. As C, but 1.5% water by weight of the cocoa butter was mixed into the oil prior to starting the deodorization.

Table 14 shows the Solid fat content as measured according to IUPAC 2.150b, the total amount of tri-saturated triglycerides (SSS) in weight % of the deodorized fat, the total amount of mono-unsaturated asymmetric triglycerides (SSO) in weight % of the deodorized fat, and the ratio between % SSO and % SSS. % SSS and % SSO are measured by standard HPLC methods.

TABLE 14

Influence of water added prior to deodorization process on fat composition.

| SFC (IUPAC 2.150b) | Amount (weight %) of selected triglycerides | Cocoa butter standard | Cocoa butter Process C | Cocoa butter Process D |
|---|---|---|---|---|
| 20° C. | | 75.5 | 72.0 | 73.5 |
| 25° C. | | 70.5 | 65.0 | 67.0 |
| 30° C. | | 49.5 | 44.5 | 46.5 |
| 35° C. | | <1 | 1.5 | 1.5 |
| | SSS | 1.5 | 1.9 | 1.9 |
| | SSO | <0.5 | 0.9 | 1.3 |
| | SSO/SSS ratio | — | 0.49 | 0.70 |

It can be seen from the data in Table 14 that process D produces more mono unsaturated asymmetric TAGs at the same temperature and time than process C.

At the same time, the ratio between mono unsaturated asymmetric TAGs and the tri saturated TAGs increases significantly by using process D compared to process C.

Importantly, the solid fat content decreases significantly less by using process D compared process C.

These results are confirmed by the texture measurements given in Table 15.

Texture measurements were performed on 100 g tablets prepared according to the procedure given in Example 3a.

All 100 gram tablets were stored at 20° C. for 4 days before measurements were taken. The tablets were then transferred to a cabinet and held at the measurement temperature for 2 days before measurements were taken.

The measurements were made using a Texture Analyzer TA-XT2i, and the probe used was the P2N needle set to penetrate 3 mm. The measured penetration force was expressed in grams.

TABLE 15

Texture measurements comparing the hardness of cocoa butter treated in different ways.

| | cocoa butter, no deodorization | Process C | Process D |
|---|---|---|---|
| Texture at 20° C., g force | 905 | 917 | 1050 |
| Texture at 25° C., g force | 720 | 709 | 841 |

As may be seen from the data in Table 15, Process C provides a product similar in hardness to that of the standard, while process D provides an even harder product.

Thus both products from process C and process D can be used as bloom-retarding components, the product from process D surprisingly having superior textural properties with a more optimal SSO/SSS-ratio.

The invention claimed is:

1. A method for producing a bloom-retarding component for chocolate and chocolate-like products, the method comprising the step of:
   Deodorizing a triglyceride composition, wherein the triglyceride composition comprises at least 40% by weight of mono unsaturated symmetric triglycerides selected from the group consisting of POP, StOSt and POSt, wherein P equals palmityl, St equals stearyl and O equals oleyl, and wherein the said triglyceride composition further comprises cocoa butter, and wherein the deodorizing taking place for at least 60 minutes at a temperature of at least 235° C.

2. The method according to claim 1, wherein the triglyceride composition comprises at least 50% by weight of mono unsaturated symmetric triglycerides selected from the group consisting of POP, StOSt and POSt, wherein P equals palmityl, St equals stearyl and O equals oleyl.

3. The method according to claim 1, wherein the deodorizing is performed for between 60 minutes to 600 minutes.

4. The method according to claim 1, wherein the deodorizing is performed at a temperature between 240° C. and 300° C.

5. The method according to claim 1, further comprising the step of adding the deodorized triglyceride composition to a fat composition for chocolate or chocolate-like products in an amount of between 0.1% and 90% by weight of the fat composition.

6. The method according to claim 5, wherein the fat composition comprises cocoa butter, a cocoa butter equivalent, of a combination of both.

7. The method according to claim 1, further comprising the step of adding the deodorized triglyceride composition to cocoa butter in an amount of 5-97% by weight of the cocoa butter.

8. The method according to claim 1, the method further comprising the step of manufacturing a chocolate or chocolate-like product comprising the deodorized triglyceride composition as the only vegetable fat.

9. The method according to claim 1, further comprising the steps of adding milk fat to the triglyceride composition pre deodorization followed by deodorizing the milk fat together with the triglyceride composition.

10. The method according to claim 1, wherein the deodorizing is performed for between 80 minutes to 480 minutes.

11. The method according to claim 1, wherein the deodorizing is performed for between 100 minutes to 360 minutes.

12. The method according to claim 1, wherein the deodorizing is performed at a temperature between 240° C. and 280° C.

13. The method according to claim 1, wherein the deodorizing is performed at a temperature between 240° C. and 260° C.

14. The method according to claim 1, further comprising the step of adding the deodorized triglyceride composition to a fat composition for chocolate or chocolate-like products in an amount of between 5% and 55% by weight of the fat composition.

15. The method according to claim 1, further comprising the step of adding the deodorized triglyceride composition to a fat composition for chocolate or chocolate-like products in an amount of between 10% and 35% by weight of the fat composition.

16. The method according to claim 1, further comprising the step of adding the deodorized triglyceride composition to cocoa butter in an amount of 10-70% by weight of the cocoa butter.

17. The method according to claim 1, further comprising the step of adding the deodorized triglyceride composition to cocoa butter in an amount of 20-50% by weight of the cocoa butter.

* * * * *